(12) United States Patent
Matsumoto

(10) Patent No.: US 9,442,900 B2
(45) Date of Patent: Sep. 13, 2016

(54) IMAGE PROCESSING APPARATUS, IMAGE PROCESSING METHOD, AND STORAGE MEDIUM

(75) Inventor: Koichi Matsumoto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 359 days.

(21) Appl. No.: 13/264,100

(22) PCT Filed: Jun. 29, 2010

(86) PCT No.: PCT/JP2010/004287
§ 371 (c)(1),
(2), (4) Date: Oct. 12, 2011

(87) PCT Pub. No.: WO2011/001664
PCT Pub. Date: Jan. 6, 2011

(65) Prior Publication Data
US 2012/0092712 A1   Apr. 19, 2012

(30) Foreign Application Priority Data
Jun. 30, 2009   (JP) ................................. 2009-156380

(51) Int. Cl.
*G06F 17/21* (2006.01)
(52) U.S. Cl.
CPC ........... *G06F 17/217* (2013.01); *G06F 17/211* (2013.01); *G06F 17/212* (2013.01)
(58) Field of Classification Search
CPC .. G06F 17/211; G06F 17/217; G06F 17/212; G06F 17/30017; G06F 3/0438
USPC .......................... 358/1.15; 715/243, 247, 251
See application file for complete search history.

(56) References Cited

U.S. PATENT DOCUMENTS

| | | |
|---|---|---|
| 5,038,298 A | 8/1991 | Matsumoto et al. |
| 5,157,773 A | 10/1992 | Matsumoto et al. |
| 6,633,685 B1 | 10/2003 | Kusama et al. |
| 6,647,125 B2 | 11/2003 | Matsumoto et al. |
| 6,704,466 B1 | 3/2004 | Yamamoto et al. |
| 6,720,971 B1 | 4/2004 | Yamamoto et al. |
| 6,724,946 B1 | 4/2004 | Kusama et al. |
| 6,731,826 B1 | 5/2004 | Yamamoto et al. |
| 6,813,394 B1 | 11/2004 | Matsumoto et al. |
| 6,927,874 B1 | 8/2005 | Enokida et al. |
| 7,685,514 B1 * | 3/2010 | Khatwani et al. ............ 715/251 |

(Continued)

FOREIGN PATENT DOCUMENTS

| | | |
|---|---|---|
| JP | 01-216462 A | 8/1989 |
| JP | 03-196253 A | 8/1991 |

(Continued)

*Primary Examiner* — Scott Baderman
*Assistant Examiner* — Seung Jung
(74) *Attorney, Agent, or Firm* — Fitzpatrick, Cella, Harper & Scinto

(57) ABSTRACT

An apparatus for arranging a plurality of elements includes a memory that stores a program and a processor that executes the program stored in the memory. The processor acquires a first element and a second element, each of which strides over a page partition position corresponding to a bottom of a first page in a vertical direction. The processor arranges the first element and the second element, so that the first element is divided, at a position of the first element corresponding to the page partition position over which the second element strides, into the first page and a second page, and a whole of the second element is arranged to the second page.

39 Claims, 16 Drawing Sheets

(56) References Cited

U.S. PATENT DOCUMENTS

| | | |
|---|---|---|
| 7,809,732 B2 | 10/2010 | Kusama et al. |
| 2004/0223175 A1* | 11/2004 | Lee .............................. 358/1.13 |
| 2005/0034068 A1* | 2/2005 | Jaeger .......................... 715/517 |
| 2006/0150093 A1* | 7/2006 | Chen ............................ 715/518 |
| 2006/0156227 A1* | 7/2006 | Hosotsubo .................... 715/517 |
| 2007/0016854 A1* | 1/2007 | Burago et al. ................ 715/517 |
| 2010/0211866 A1* | 8/2010 | Nicholas et al. ............. 715/234 |

FOREIGN PATENT DOCUMENTS

| | | |
|---|---|---|
| JP | 06-342430 A | 12/1994 |
| JP | 09-069098 A | 3/1997 |
| JP | 11-015749 A | 1/1999 |
| JP | 2007-034370 A | 2/2007 |

\* cited by examiner

IMAGE PROCESSING APPARATUS, IMAGE PROCESSING METHOD, AND STORAGE MEDIUM

TECHNICAL FIELD

The invention relates to an image processing apparatus for outputting an image based on a structured document.

BACKGROUND ART

In recent years, a Web page is displayed by accessing a server on the Internet and various kinds of information can be obtained. The Web page is a structured document described by a structured language (markup language) such as HTML (Hyper Text Markup Language) or XHTML (Extensible Hyper Text Markup Language). By analyzing the structured document by software called Browser corresponding to the described structured language, the Web page can be displayed on a display.

In the case of printing those Web pages, the Web pages are arranged onto a page to be printed and a printing or a print preview is performed. However, there is a case where the Web pages cannot be fully arranged in the page to be printed.

To solve such a problem, therefore, a method of reducing an image so that the whole image is included in a page has been disclosed in the Official Gazette of Japanese Patent Application Laid-Open No. 11-015749.

However, according to the above method in the related art, there is a case where by reducing the image and printing, it becomes difficult for the user to recognize contents of the image included in a printed matter.

When the Web page is arranged to a plurality of pages, since it is arranged to the different pages, there is a case where it becomes difficult for the user to recognize the contents of the printed matter in dependence on the contents of the Web page.

Therefore, the invention provides an image processing apparatus for properly deciding a layout of elements to each page according to contents of the elements and outputting an image.

CITATION LIST

Patent Literature

PTL 1: Japanese Patent Application Laid-Open No. H11-015749

SUMMARY OF INVENTION

According to the invention, a layout of elements to each page is properly decided according to the contents of the elements and an image can be output.

Further features of the present invention will become apparent from the following description of exemplary embodiments with reference to the attached drawings.

DESCRIPTION OF EMBODIMENTS

A mode for carrying out the invention is the following embodiment.

Figure 1:
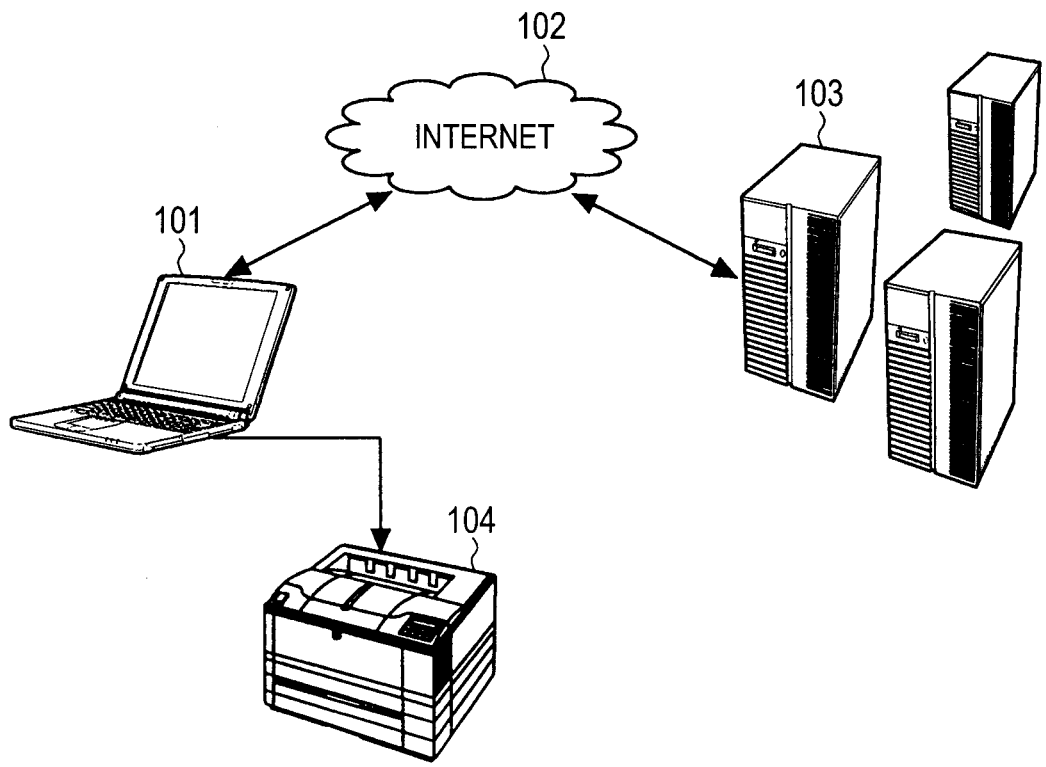
FIG. 1 is a diagram illustrating a construction of a network system including a print control apparatus.

FIG. 1 is a diagram illustrating a construction of a network system including a print control apparatus.

A PC 101 is a personal computer. The PC 101 is connected to an Internet 102, downloads Web pages from a plurality of WWW servers 103 onto the PC 101 through the Internet 102, and displays them. The Web page is a structured documents described by the HTML or XHTML. The PC 101 is locally connected to a printer 104, downloads the Web pages on the WWW servers 103 onto the PC 101, and allows the printer 104 to print them.

Figure 2:
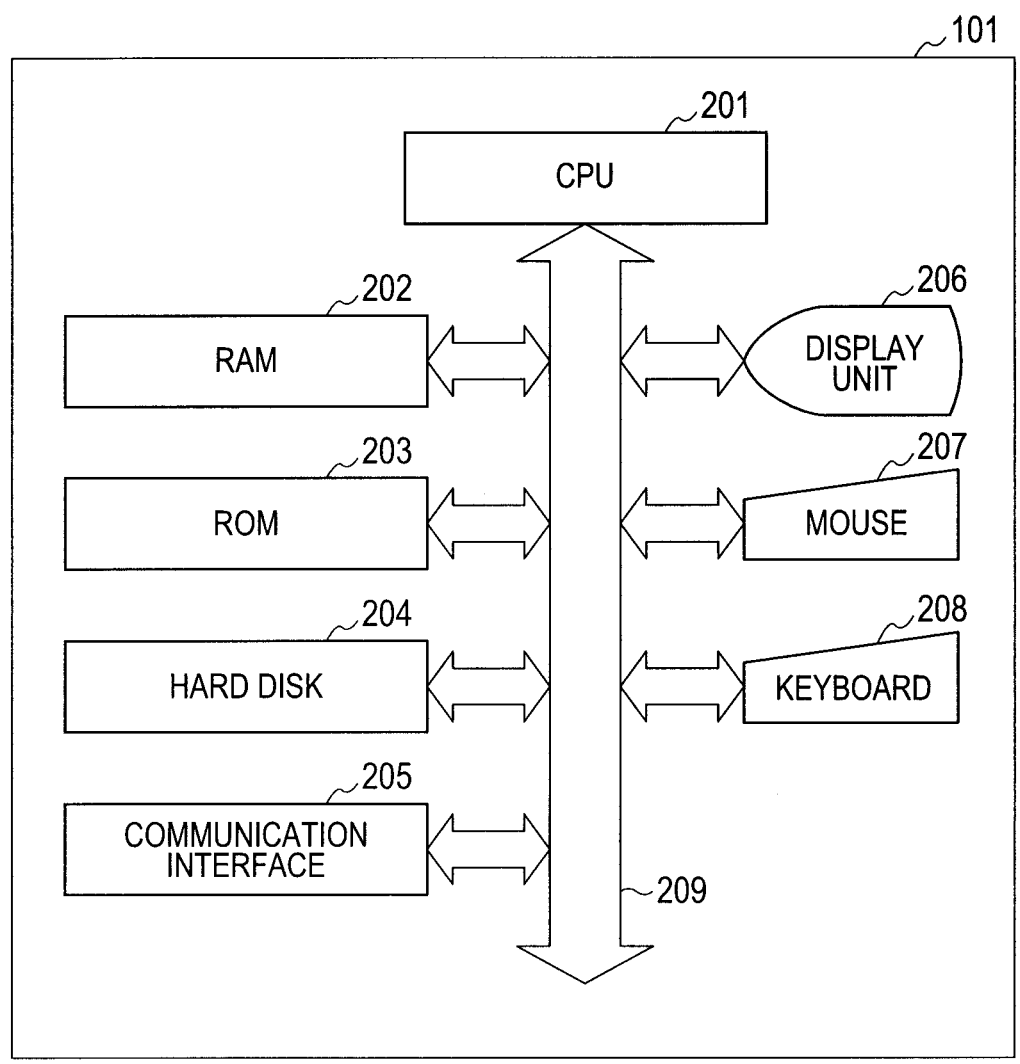
FIG. 2 is a block diagram illustrating a construction of a PC 101.

FIG. 2 is a block diagram illustrating a construction of the PC 101.

The PC 101 has a CPU 201, a RAM 202, a ROM 203, a hard disk 204, a communication interface 205, a display unit 206, a mouse 207, a keyboard 208, and a system bus 209.

The CPU 201 executes arithmetic operation, discrimination and control regarding data or comments, according to a program stored in the RAM 202, ROM 203, or hard disk 204. The RAM 202 is used as a temporary storage area in the case where the CPU 201 executes various kinds of processes. An operating system (OS), a Browser, other application software, and the like are recorded in the hard disk 204. That is, the CPU 201 reads out the program stored in the ROM 203 or the hard disk 204, stores it into the RAM 202, and executes the program by using the RAM 202 as a work memory, thereby making various kinds of control.

The communication interface 205 is, for example, an interface such as USB, SCSI, radio transmission, or the like for making data communication with the printer 104 or a network interface for making data communication with the external WWW servers 103 through the Internet 102. The display unit 206 is constructed by a CRT or a liquid crystal display and a graphics controller and performs a display in a graphics user interface (GUI). The mouse 207 and the keyboard 208 are input devices which are used for the user to issue various kinds of instructions to the PC 101. The system bus 209 performs a transmission and a reception of data between the CPU 201 and the RAM 202, ROM 203, hard disk 204, and the like.

Figure 3:
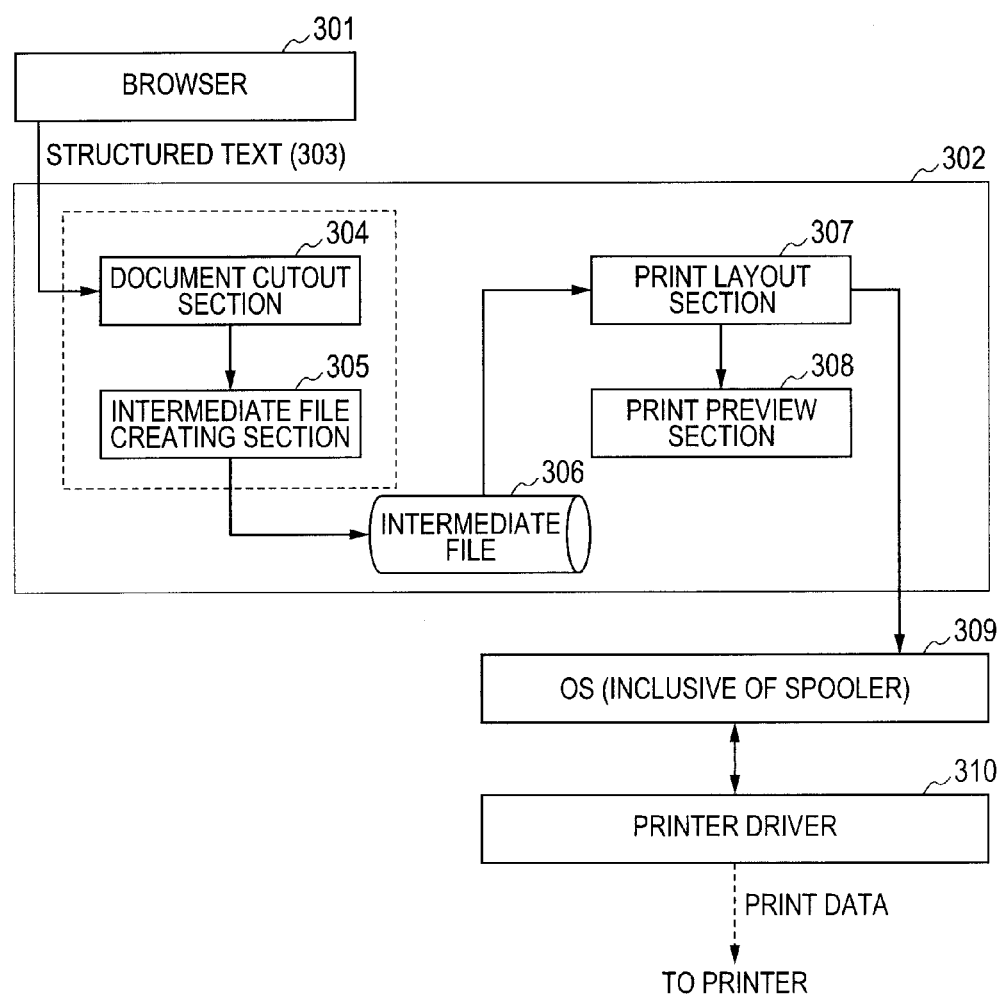
FIG. 3 is a block diagram illustrating a construction of software on the PC 101.

Subsequently, the program which operates on the PC 101 and its data processing construction will be described. FIG. 3 is a block diagram illustrating a construction of software on the PC 101. Each block illustrated in FIG. 3 is a block in which the programs stored in the ROM 203 or the hard disk 204 have been classified every function. Those programs are executed by the CPU 201.

A browser 301 is an application to display the Web pages, downloads the Web pages on the WWW servers 103 into the hard disk 204 on the PC 101, and displays them to the display unit 206. The Web pages are structured document files such as HTML, XHTML, and the like and elements constructing a structured document such as a text or image have been described in the Web page by using tags. Another file called a Cascading Style Sheet (hereinbelow, abbreviated to "CSS") for designating a display style of those elements has been designated in the structured document. The browser 301 analyzes those structured document files and displays them onto the display unit 206.

A structured document print module 302 is plug-in software which is called from the browser 301. When the user instructs the browser 301 to execute a printing or a print preview, the structured document print module 302 is executed. The structured document print module 302 is classified into two sections of a set of a document cutout section 304 and an intermediate file creating section 305 and a set constructed by other sections.

When the user applies an instruction to select a print area by using the mouse 207 or the like to the document cutout section 304, the document cutout section 304 inputs the instruction and determines the print area in the Web page. Thus, the intermediate file creating section 305 creates an intermediate file 306 such as an EMF (Extend Meta File) corresponding to the decided print area or the like. The created intermediate file is stored into, for example, the RAM 202.

A print layout section 307 executes processes at the time of printing a plurality of pages, and arranges the elements included in the structured document into a page, according to a set paper size based on print settings. The print settings include information such as paper size, resolution, printable area, and the like and are obtained from a printer driver 310 through an OS (Operating System) 309. Details of a plural-page print process will be described hereinafter. A print preview section 308 displays the elements, as a print preview, arranged by the print layout section 307 onto the display unit 206. In the print process, when a print start instruction is received from the user, the printer driver 310 is allowed to execute a drawing process through the OS 309 according to layout information of the elements arranged by the print layout section 307.

The OS 309 provides an API (Application Programing Interface) for allowing the structured document print module 302 to transmit and receive the print setting data to/from the printer driver 310 and an API for executing the drawing process. Although various kinds of control software such as spooler system for managing a print job, port monitor for outputting a printer command to a port, and the like is included in the OS 309, its detailed description is omitted here. After the printer driver 310 creates print data according to the drawing process executed by the print process and converts it into the printer command, the printer driver 310 transmits the printer command to the printer 104 through the OS 309 and the printer 104 records onto paper.

Subsequently, a program which operates in the print layout section 307 and its data processing construction will be described.

Figure 4:
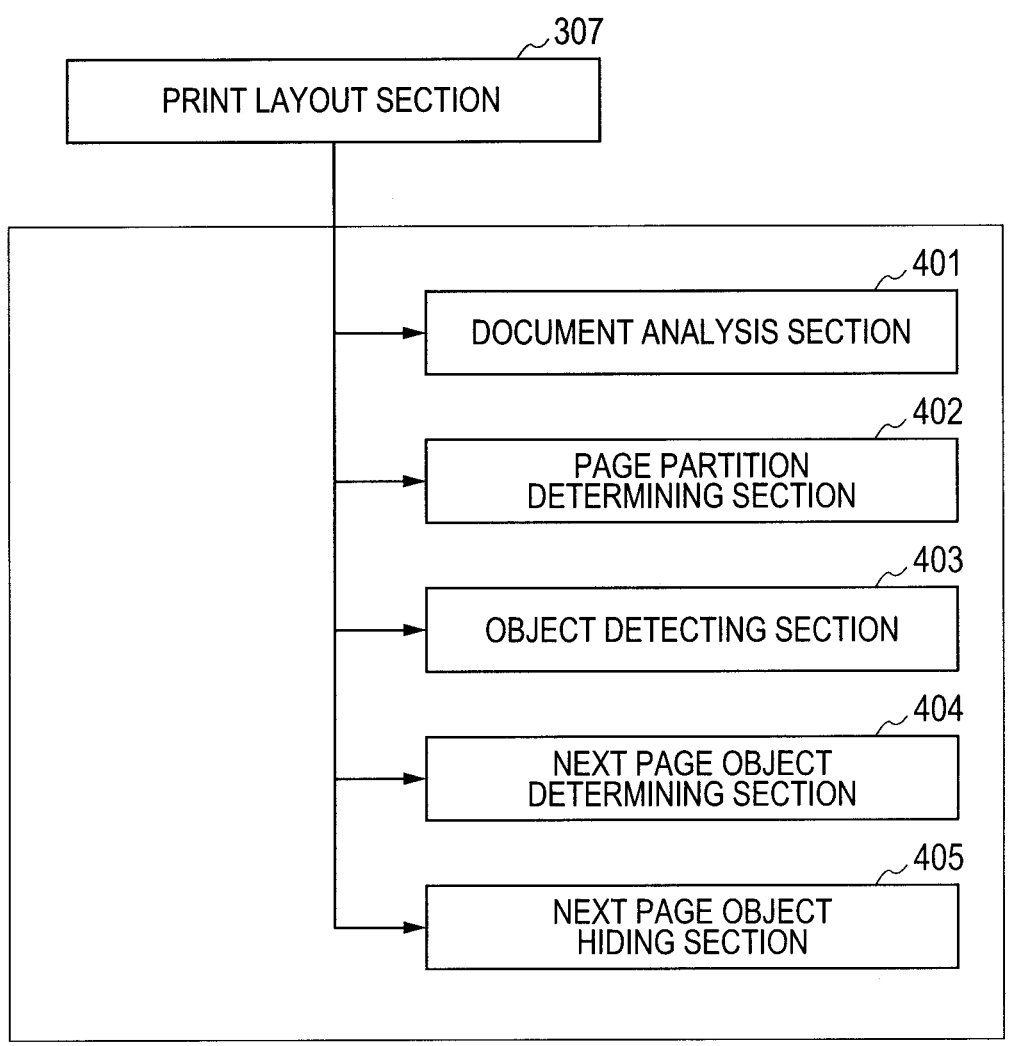
FIG. 4 is a block diagram illustrating a construction of software in a print layout section 307.

FIG. 4 is a block diagram illustrating a construction of software in the print layout section 307. A document analysis section 401 fetches the intermediate file 306 serving as an EMF file. When a print area overlaps with a plurality of pages, a page partition determining section 402 determines a page partition in a print target area. An object detection section 403 detects an object arranged at the page partition determined by the page partition determining section 402. If a next page object determining section 404 determines that the detected object is a next page print element, a next page object hiding section 405 processes so that the object is not displayed in the corresponding page.

Figure 5:
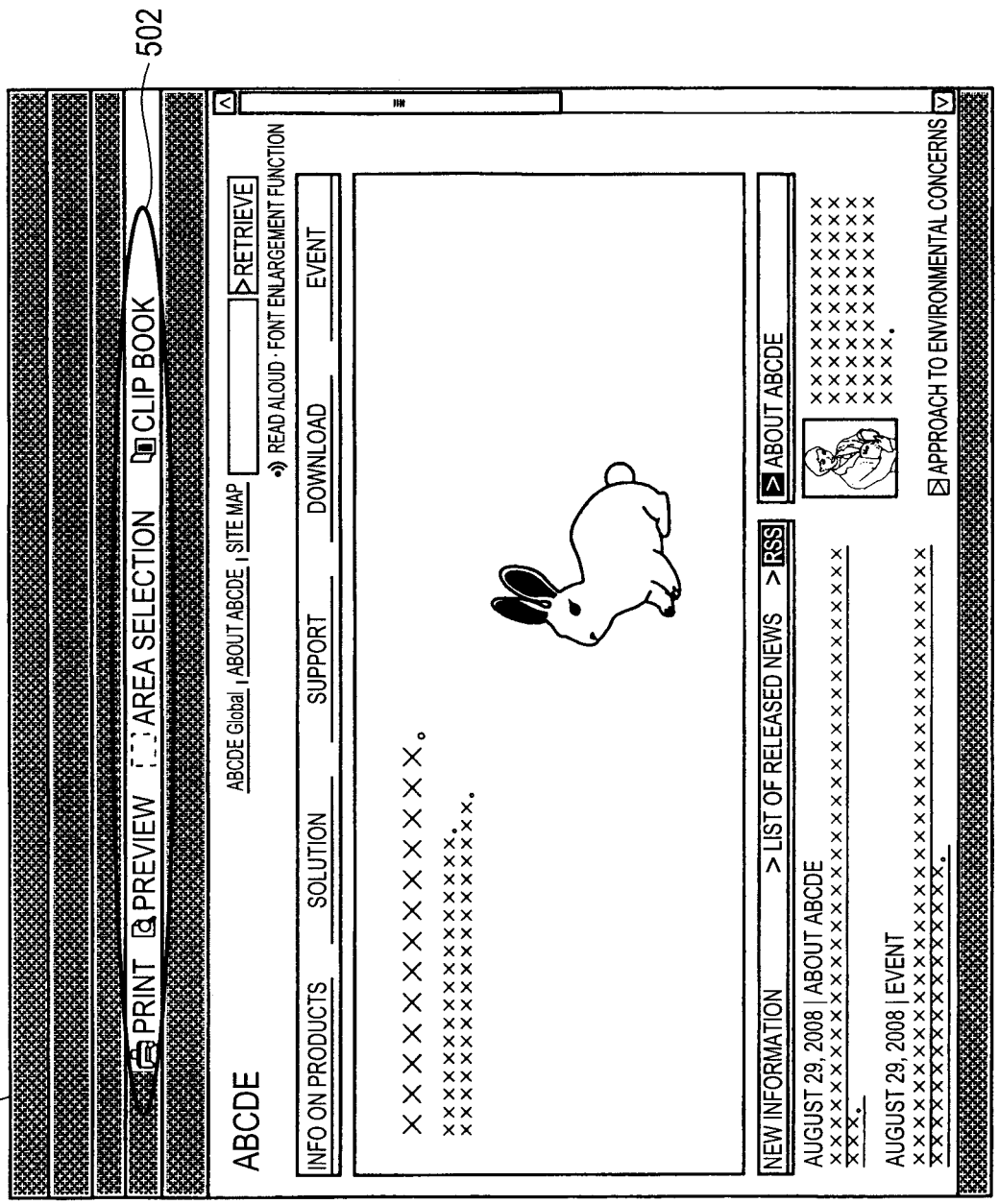
FIG. 5 is a diagram illustrating an example of a GUI screen which is displayed by the software on the PC 101.
Figure 6:
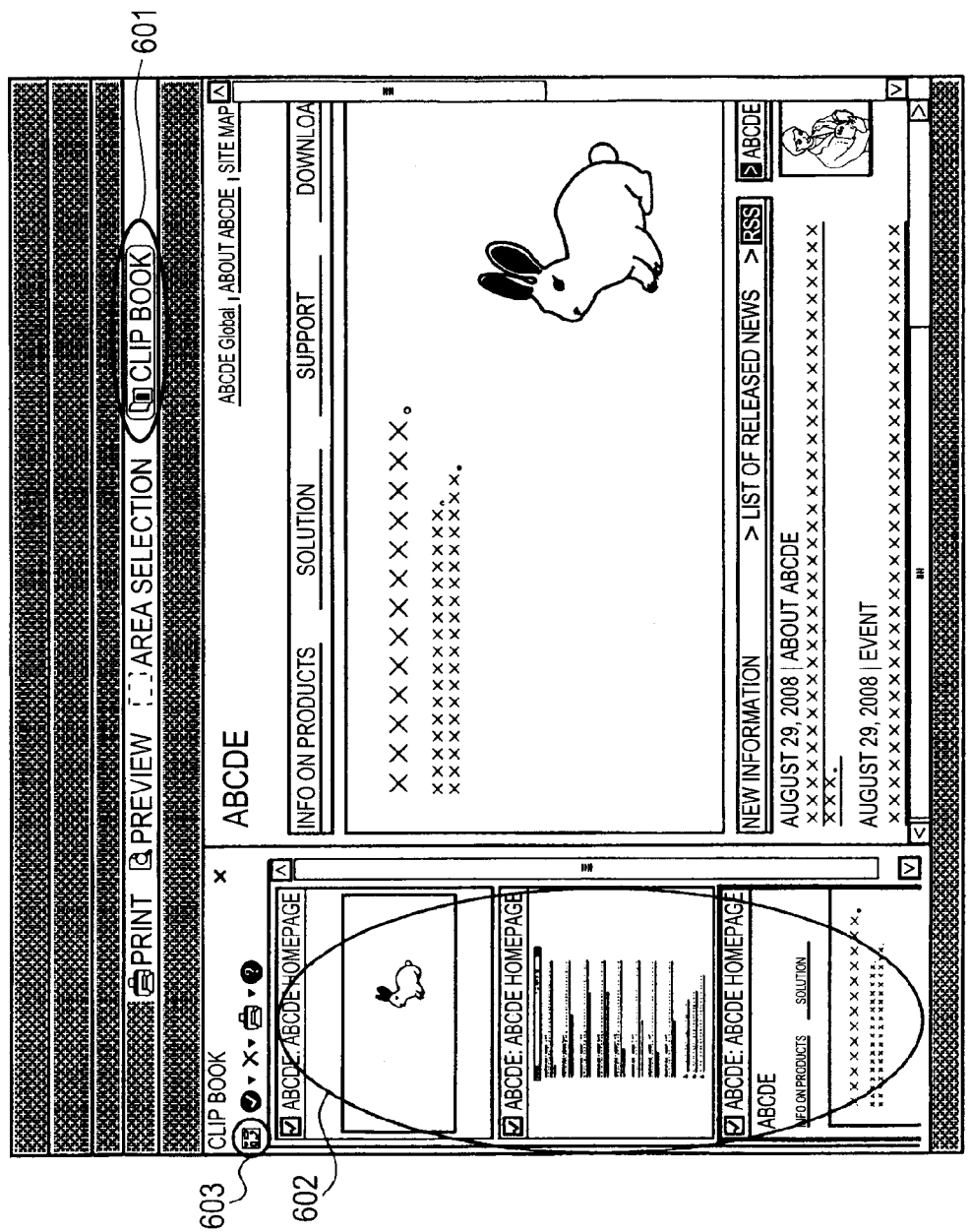
FIG. 6 is a diagram illustrating an example of a GUI screen which is displayed by the software on the PC 101.
Figure 7:
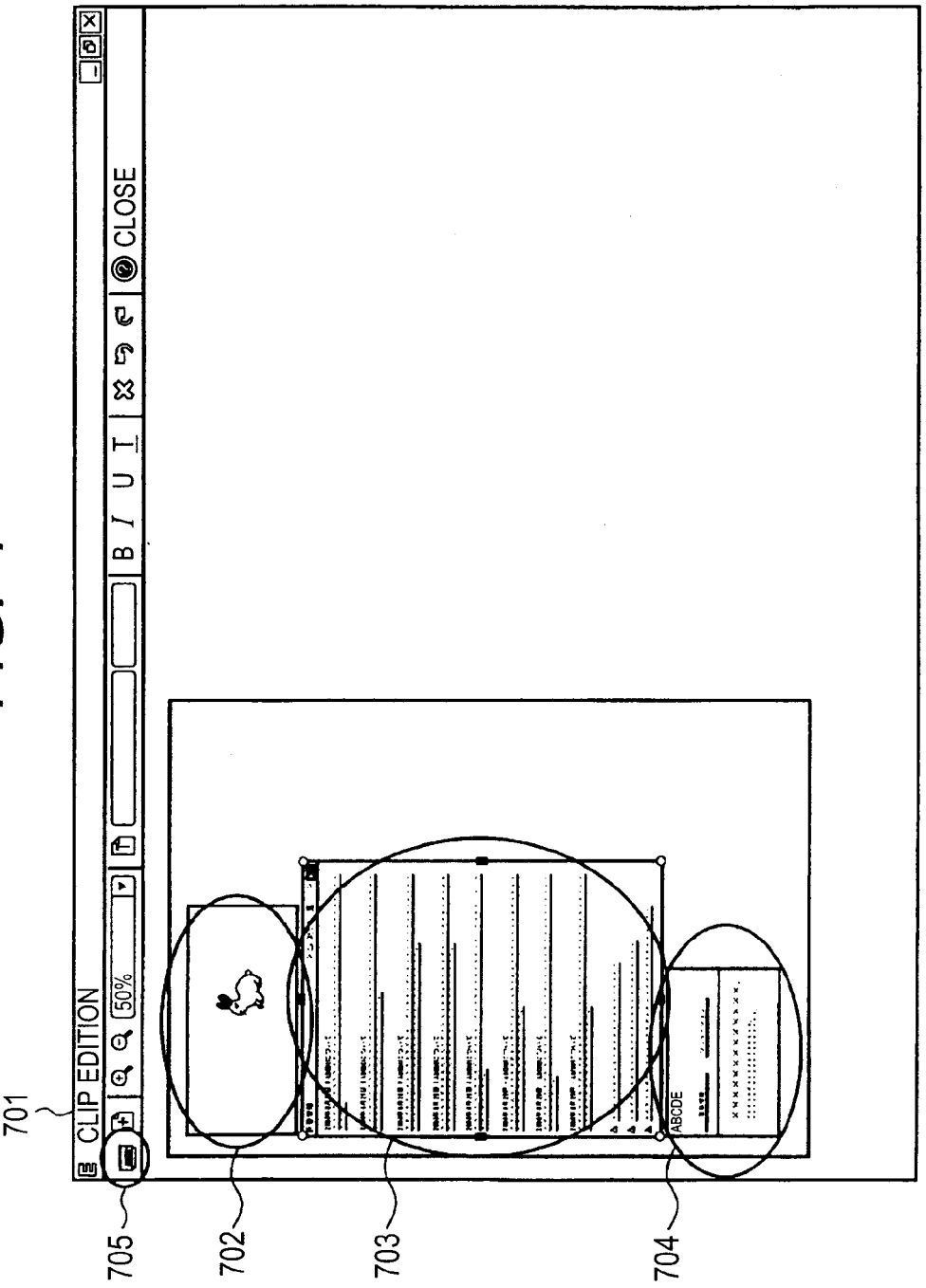
FIG. 7 is a diagram illustrating an example of a GUI screen which is displayed by the software on the PC 101.

Each of FIGS. 5, 6 and 7 is a diagram illustrating an example of a GUI screen which is displayed by the software on the PC 101 serving as a print control apparatus. A window of the Browser 301 becomes the GUI screen illustrated in each of FIGS. 5 and 6.

As illustrated in FIG. 5, the browser 301 displays the Web page into the window as a GUI 501. A button group 502 is arranged in the window of the browser 301. The button group 502 is constructed by a print button, a preview button, an area selection button, and a clip book button.

When the user depresses the print button, all of the Web pages displayed by the browser 301 are printed. When the user depresses the preview button, a print preview screen is displayed. When the user further depresses the area selection button, a frame adapted to select a print target range is displayed.

When a clip book button 601 illustrated in FIG. 6 is depressed, a thumbnail 602 of an image cut out by the print target range is displayed. Further, when the image in the thumbnail 602 is edited, an edit button 603 is depressed.

When the edit button 603 is depressed, as illustrated in FIG. 7, an edit screen 701 including images 702, 703, and 704 which were thumbnail-displayed is displayed. As for the images 702, 703, and 704, an enlargement, a reduction, a movement, or the like can be performed by the operation of the mouse 207 or the like by the user. When a print button 705 is depressed, a result obtained by editing each of those images by the enlargement, reduction, movement, or the like is printed.

Figure 8:
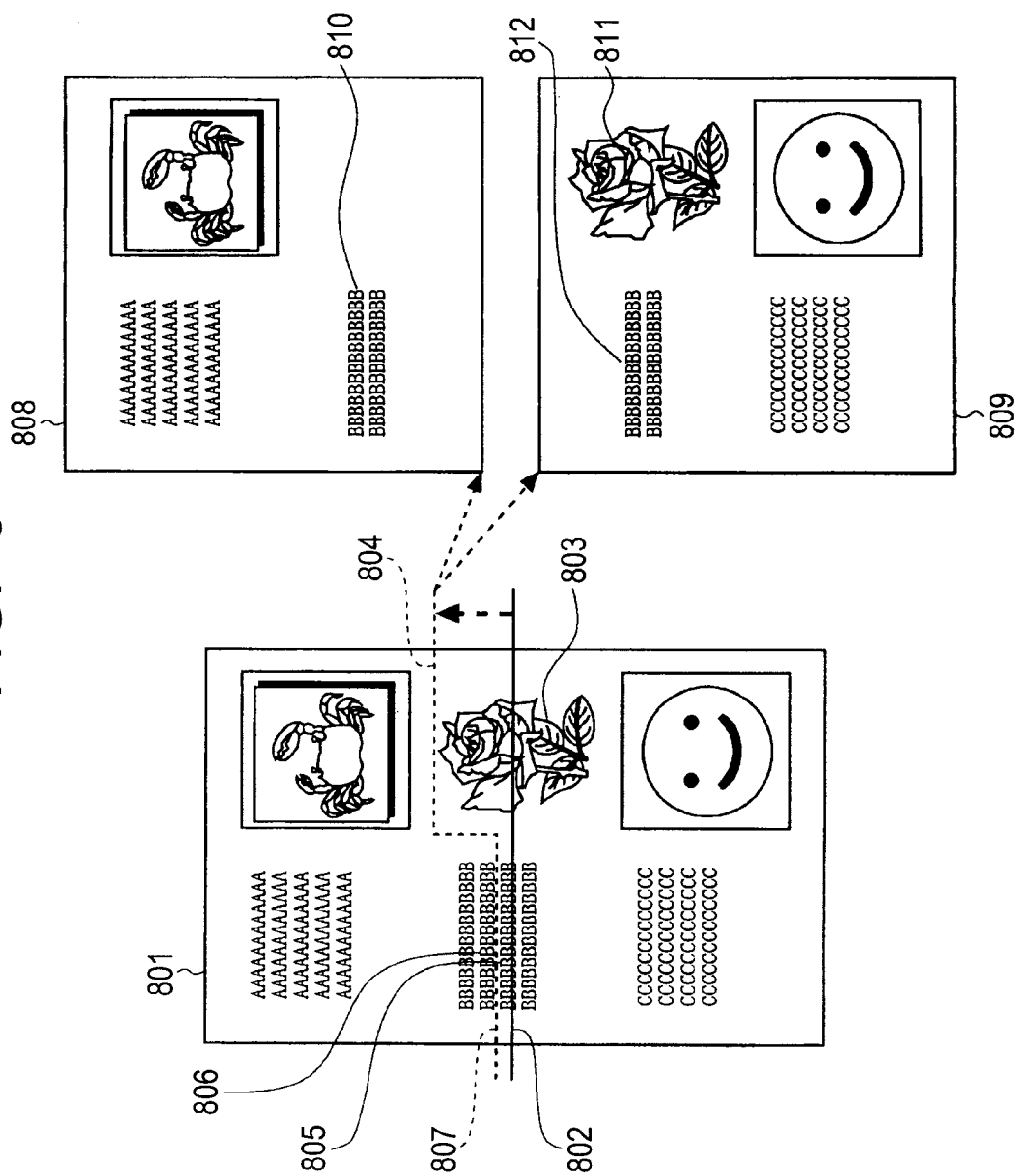
FIG. 8 is a conceptual diagram illustrating an outline of the operation in an embodiment.
Figure 9:
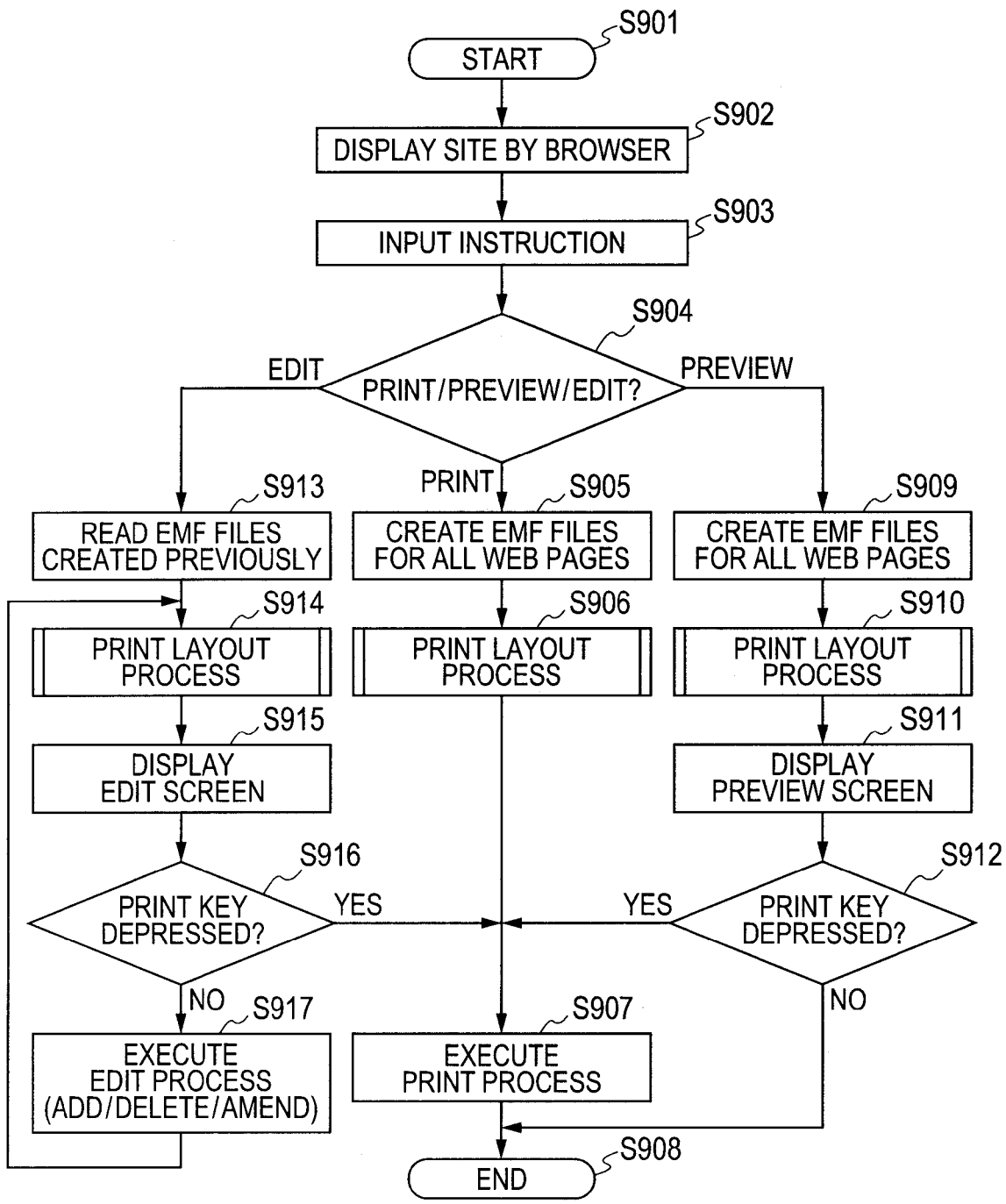
FIG. 9 is a flowchart illustrating processes in the embodiment.

FIG. 8 is a conceptual diagram illustrating an outline of the operation in the embodiment. FIG. 9 is a flowchart illustrating processes in the embodiment. First, the Web pages are displayed by the browser 301 (S902). An instruction by the user is input (S903). As described in FIG. 5, the processes are separated by the instruction input by the user. When the print button is depressed, the intermediate file creating section 305 creates EMFs of all of the displayed Web pages (S905). After that, a process between the pages is executed by a print layout process (S906) illustrated in FIG. 8. The printer driver 310 prints through the OS 309 (S907).

When the preview button is depressed, the intermediate file creating section 305 creates EMFs of all of the displayed Web pages in a manner similar to that mentioned above (S909). After that, a process between the pages is executed by a print layout process (S910) illustrated in FIG. 8. The print preview section 308 allows the display unit 206 to display a print image (S911). After that, when the print button illustrated in the print preview screen is depressed (S912), the foregoing print process is executed (S907). When the edit button is depressed (S904) by the instruction of the user (S903), the EMF files which have previously been created at the time of the selection of the print target area are read (S913). A print layout process (S914) illustrated in FIG. 8 is executed. An edit screen is displayed on the display unit 206 (S915). When the print button is depressed on the edit screen, the print process is executed (S907). When an edit process such as addition, deletion, further, enlargement/reduction, or the like is executed on the edit screen (S917), the print layout process (S914) described in FIG. 8 is executed again and the edit screen is displayed on the display unit 206 (S915).

Subsequently, the print layout process will be described in detail. In the image displayed by the browser 301, although only a part of it is displayed on the display unit 206, a case where an image constructed by two pages of a first page 808 and a second page 809 is a present print target area 801 at the time of the print layout will now be considered. The user selects the print target area 801 by scrolling or the like by using the mouse or the like. The intermediate file 306 as an EMF file is created by using the intermediate file creating section 305 from the print target area 801 cut out by the document cutout section 304.

Figure 10:
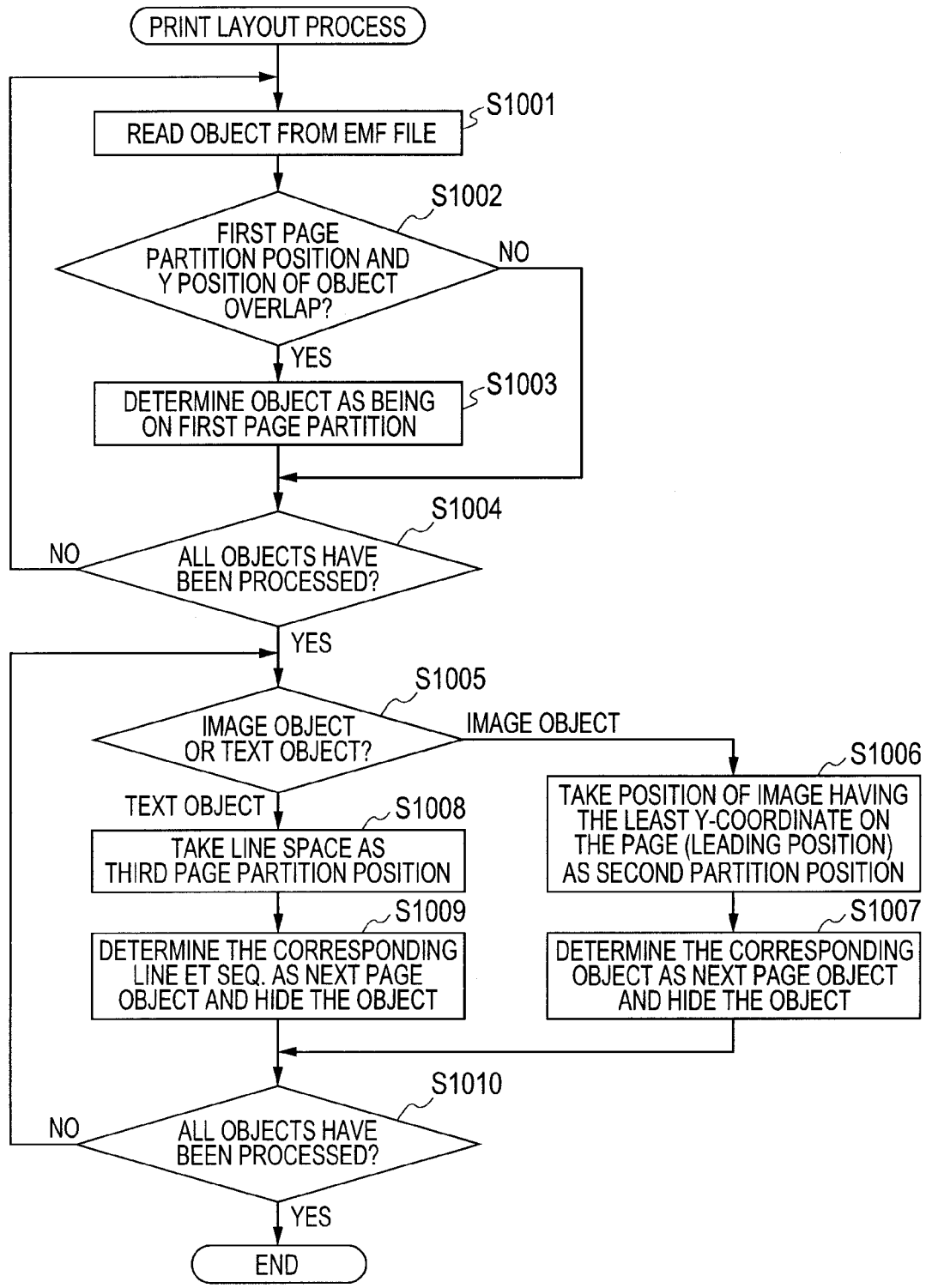
FIG. 10 is a flowchart illustrating a print layout process (page partition process).

FIG. 10 is a flowchart illustrating the print layout process (page partition process). The print layout section 307 reads a file created as an intermediate file 306 as an EMF file (S1001). The object existing at a first page partition position 802 is detected based on position information showing coordinates from a leading position of the page of each object element in the intermediate file 306 and size information of each object (S1002). It is assumed that the object element is divided into either a text object element or an image object element.

The text object element is defined by a tag in the structured document and is an element in which a corresponding character string is described in the structured document. The corresponding character string can be displayed or printed based on the text object element. The division of the text object element, which will be described hereinafter, corresponds to a process for dividing the character string included in one text object element.

The first page partition position 802 indicates a page partition of a rear edge of the first page. Subsequently, it is determined that the object detected in S1002 is the object existing at the first page partition position 802 (S1003). Subsequently, whether or not the processes of all objects detected in S1002 have been finished is discriminated (S1004). If the processes are not finished yet, the processing routine is returned to S1001. If the processes have been finished, whether the determined object is the image object or the text object is discriminated (S1005). If it is the image object, in the case where it is confirmed that another object does not exist at the leading position in the page of such an object or at a position within a predetermined distance from the leading position, such a position within the predetermined distance is set to a second page partition position 804 (S1006).

Whether or not a text character string exists at the first page partition position 802 is discriminated based on a relative position from the leading position of the page and a size of character string (S1005). If the text character string exists, a space (line space) between such a text character string 805 and a one-preceding character string 806 near the leading position is set to a third page partition position (S1008).

The next page object determining section 404 determines that an image object 803 existing at the first page partition position 802 is an object of the next page of the corresponding page at the time of the print layout of the first page 808.

Therefore, control is made in such a manner that at the first page, the next page object hiding section 405 does not display the image object 803 existing at the first page partition position 802 (S1007).

In a manner similar to the above, the next page object determining section 404 determines that the text character string 805 existing at the first page partition position 802 including its subsequent character strings is a next page object. Therefore, control is made in such a manner that at the first page, the next page object hiding section 405 does not display the text character string 805 existing at the first page partition position including its subsequent character strings (S1009). Thus, a character string 810 on the leading position side of the third page partition position of the corresponding text object is displayed at the first page. The processes of S1005 to S1009 are executed until the processes of all objects are finished (S1010). As mentioned above, the print layout process of the first page is executed.

Figure 11:
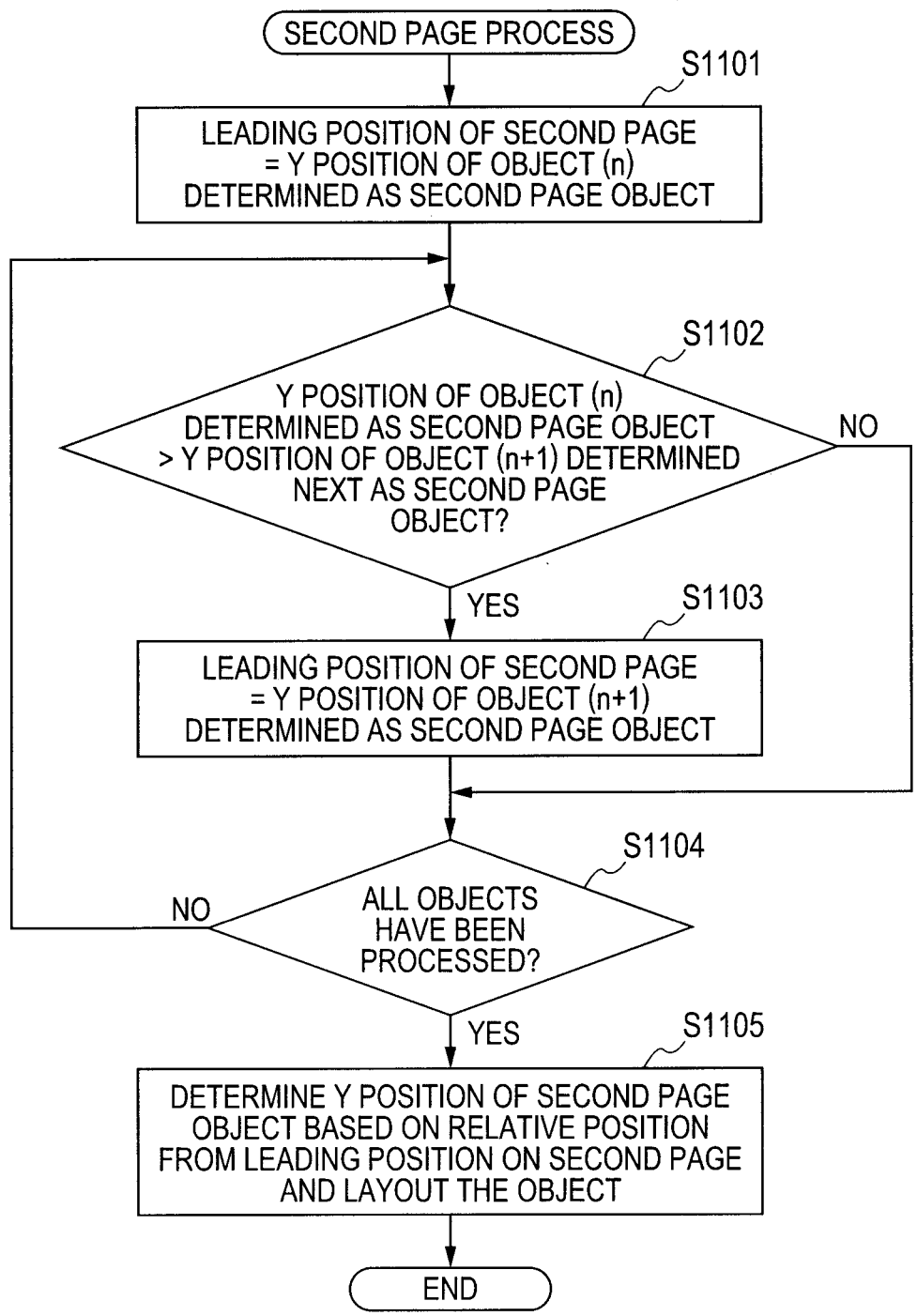
FIG. 11 is a flowchart illustrating a print layout process of a second page.

Subsequently, a layout of the second page will be described. FIG. 11 is a flowchart illustrating a print layout process of the second page. At the second page, an image object 811 which has been determined so as to be hidden at the first page and a text object 812 are arranged. At this time, a position Y on the page at the leading position of the first object which has been determined as a next page object is assumed to be a leading position of the second page (S1101).

After the position Y of the first object which has been determined as a next page object was set to the leading position of the second page, it is compared with the positions of all of the objects which are arranged at the second and subsequent pages, thereby obtaining the leading position of the second page. First, the leading position Y of the first object which was determined as a next page object is compared with the position of the object which has been determined second as a next page object (S1102). That is, whether or not the Y coordinate of the first object is smallest (on the leading position side of the page) is discriminated. If it is determined that the first object is not the object existing at the leading position, the leading position the second page is changed to the leading position of the object which has been determined second as a next page object (S1103). Whether or not the comparisons of all of the objects have been finished is discriminated (S1104). Also in the case where it is determined in S1102 that the leading position Y of the first object which has been determined as a next page object is located at the leading position side of the page, the processing routine similarly advances to S1104.

When the leading position of the second page is obtained as mentioned above, based on the information showing the relative position of the object from the leading position of the second page, each object is arranged in a state where the relative position of the object at the Web page of each object has been held as illustrated in FIG. 8 (S1105). With respect to the text object, the character string displayed at the first page is not displayed at the second page.

As mentioned above, such a situation that characters or an image is divided at the partitions of a plurality of pages can be prevented. The printing can be performed while holding the relative position at the Web page of each object element.

By setting the page partition positions which differ depending on each object (characters or image), the partition of the characters or image at the partition positions in a plurality of pages can be prevented. The printing or print preview can be performed while holding the relative position at the Web page of each object element.

Figure 12:
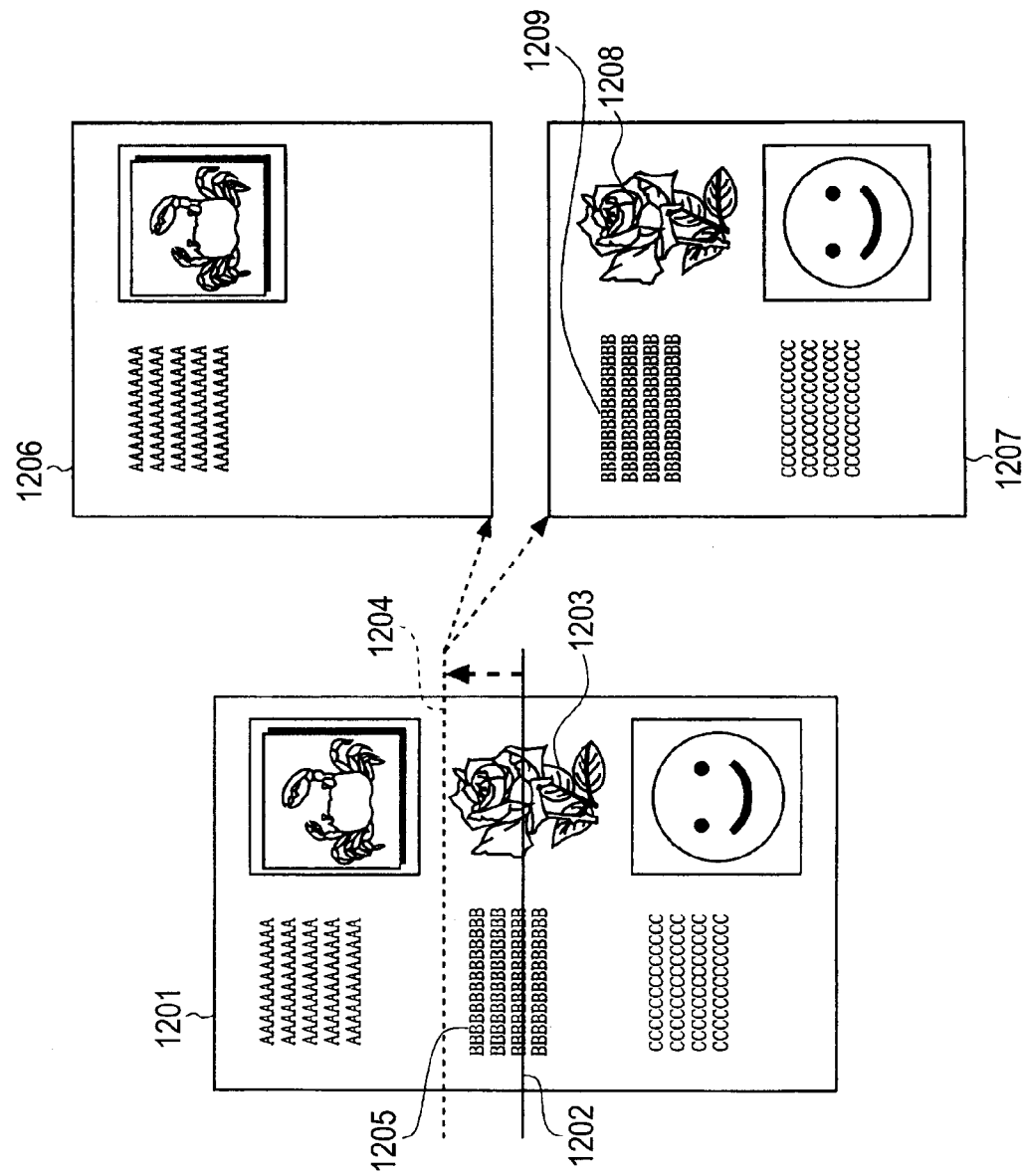
FIG. 12 is a diagram for describing a determination of a page partition.
Figure 13:
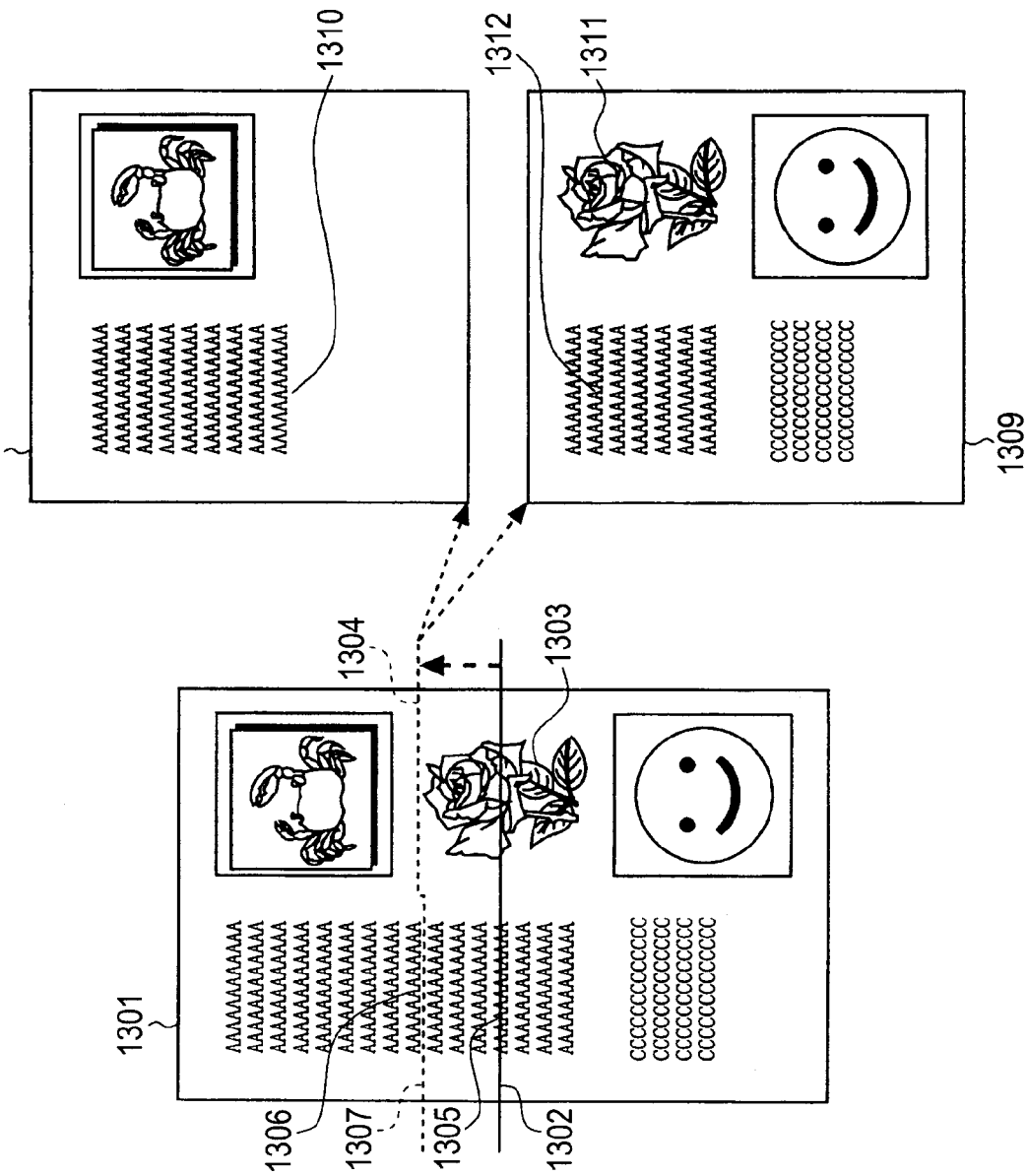
FIG. 13 is a diagram for describing a determination of a page partition.
Figure 14:
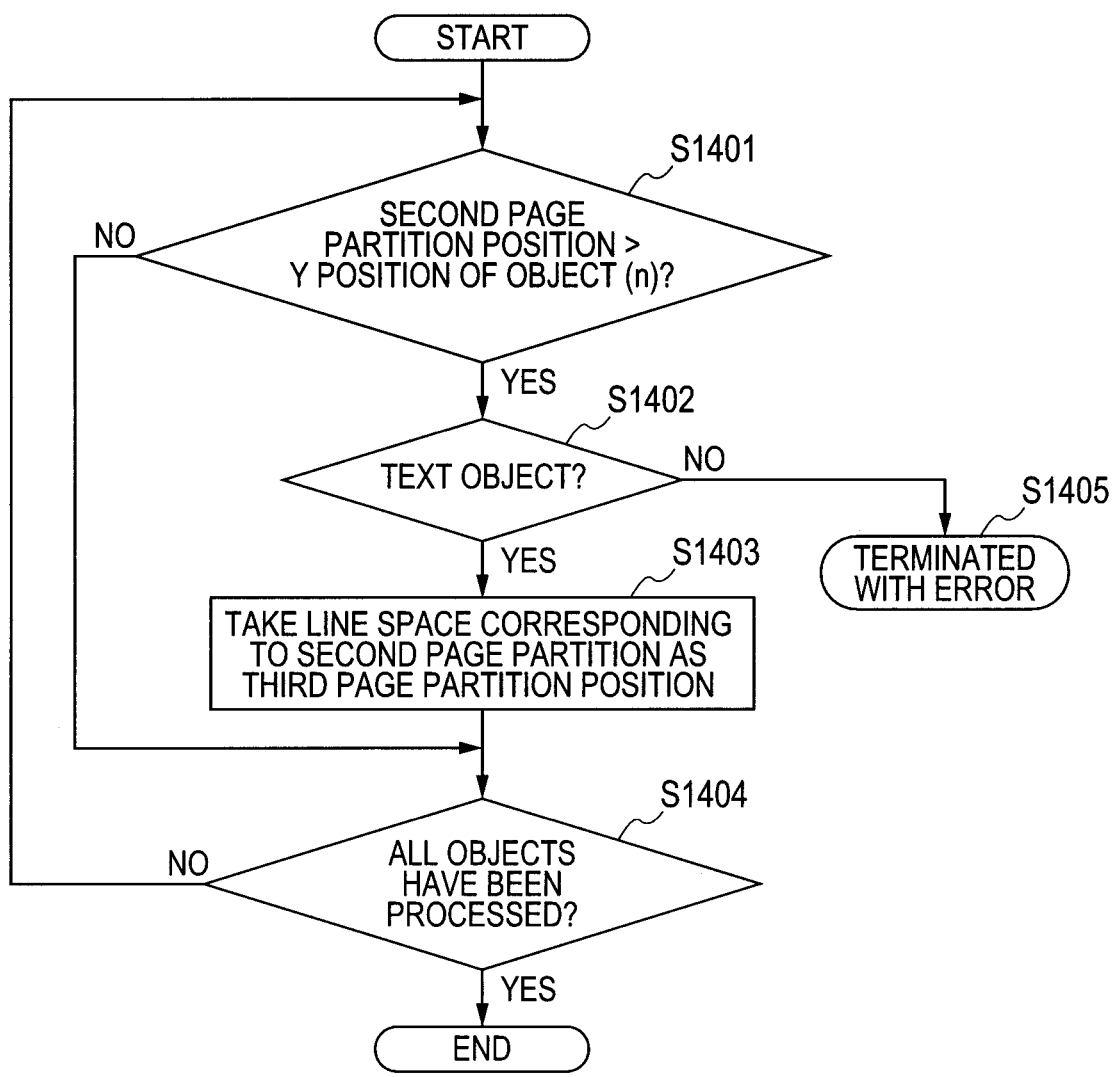
FIG. 14 is a flowchart illustrating a processing procedure at the time of a page division.

Although the page partition has been determined based on the position from the page partition position with respect to both of the image object and the text object in the above description, an example in which the page partition position of the image object is reflected to the page partition position of the text object will be subsequently described. FIGS. 12 and 13 are diagrams for describing a determination of the page partition. FIG. 14 is a flowchart illustrating a processing procedure at the time of a page division.

In the flowchart of FIG. 14, first, the second page partition position serving as a leading position of the image object is compared with the position of the object existing at the page partition position (S1401).

For example, in the example illustrated in FIG. 12, characters 1205 and an image 1203 exist in a print target area 1201. If the characters 1205 or the image 1203 exists at a page partition 1202, a top position 1204 thereof is determined as a second page partition position. In this case, since the second page partition position exists on the leading side as a result of the discrimination of S1401, S1404 follows and the processing routine is finished without executing processes of S1402 and S1403. At this time, the second page partition position is set to the third page partition position serving as a page partition position of the text object. Consequently, such a situation that a character object 1209 overlaps with two pages of a first page 1206 and a second page 1207 can be prevented. The whole character object 1209 can be set to a next page together with an image object 1208.

Subsequently, an example of another print target area is illustrated in FIG. 13. As illustrated in FIG. 13, the leading position of the image is set to a second page partition position 1304 so as to avoid an image object 1303 existing at a first page partition position 1302 as a page partition. Thus, since a character object 1306 exists on the leading side of the second page partition position 1304, S1402 follows. Whether or not the object arranged at the second page partition position 1304 is a text object is confirmed (S1402). If it is the text object, a space between the character strings corresponding to the second page partition is set to a third page partition position 1307 (S1403). Each of character objects 1310 and 1312 can be divided and printed. The processes of S1401 to S1403 are repeated to all objects existing at the page partition (S1404).

If a plurality of text objects exist at the second page partition position 1304, there are a plurality of page partitions and the page partition position is set for each text object. At this time, the page partition position of the text object is set to a line space corresponding to the second page partition position as mentioned above. Since no image object ought to exist at the second page partition position 1304, if it is determined that the image object exists, the processing routine is finished with an error (S1405).

However, in the case of determining the page partition of the image object as mentioned above, such a situation that an image and an additional image thereof are arranged on different pages can occur. For example, even in the case where a certain image does not overlap with the first page partition position and it is arranged in the corresponding page, if the additional image of such an image overlaps with the first page partition position, it is arranged to the next page.

Figure 15:
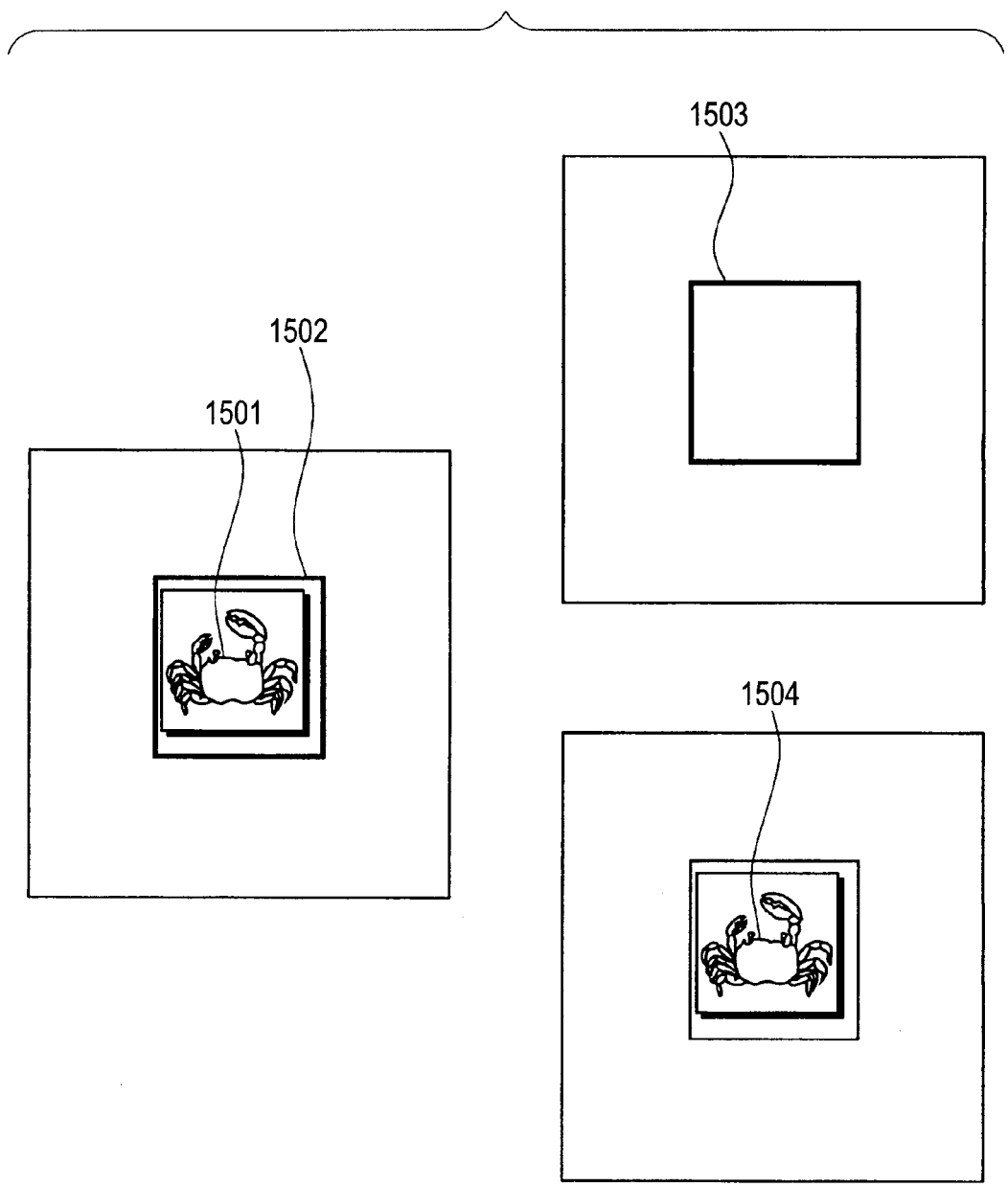
FIG. 15 is an explanatory diagram of an image detecting process associated with an image.
Figure 16:
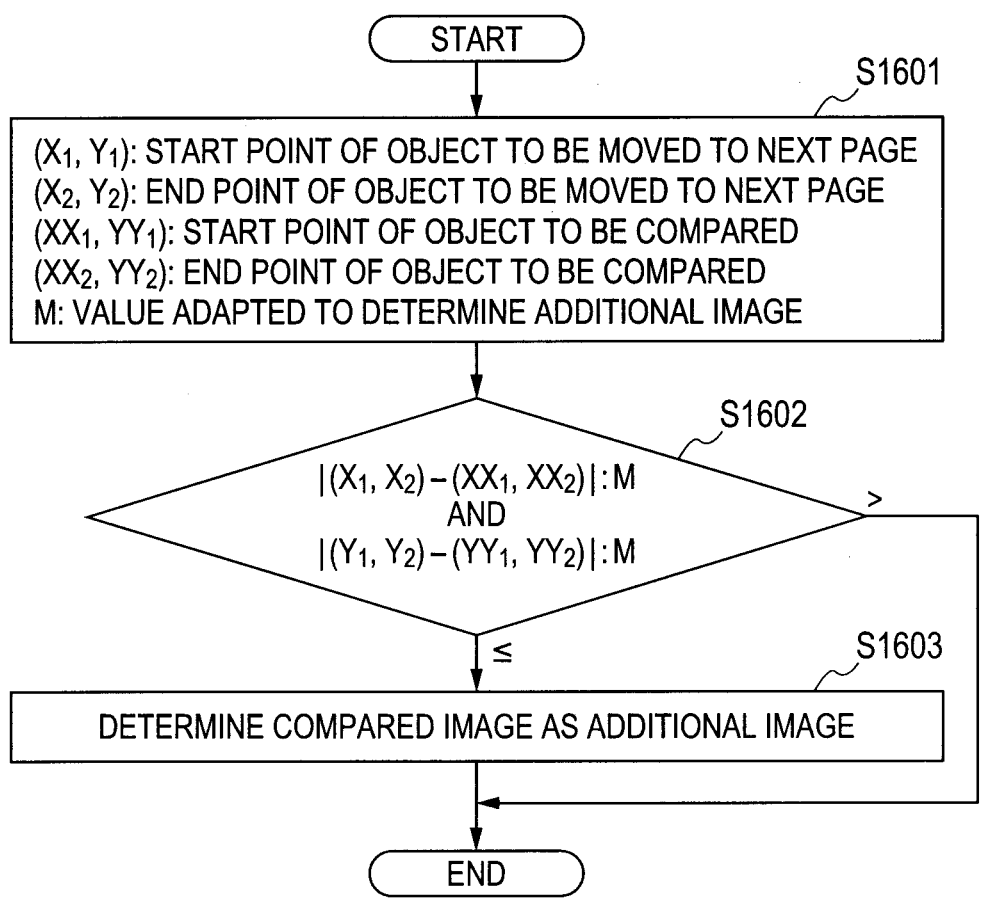
FIG. 16 is a flowchart illustrating the image detecting process associated with the image.

FIG. 15 is an explanatory diagram of an image detecting process associated with an image. FIG. 16 is a flowchart illustrating the image detecting process associated with the image.

As illustrated in FIG. 15, there is a case where a second image 1502 existing near a first image 1501 is arranged in association with the image 1501 integratedly with the first image 1501. Therefore, a process for discriminating whether or not the second image 1502 is an additional image of the image will be described with reference to FIG. 16.

First, in S1601, values of four sides of the first image 1501 are assumed to be (X1, X2) (Y1, Y2) and values of four sides of the second image 1502 serving as a comparison target are assumed to be (XX1, XX2) (YY1, YY2). In this case, left upper coordinates in the page of the image 1501 are set to (X1, Y1) and right lower coordinates are set to (X2, Y2). Left upper coordinates in the page of the image 1502 are set to (XX1, YY1) and right lower coordinates are set to (XX2, YY2). A value adapted to determine the additional image is assumed to be a predetermined value M.

Subsequently, whether or not a start point value and an end point value (X1, X2) (Y1, Y2) of the first image 1501 and a start point value and an endpoint value (XX1, XX2) (YY1, YY2) of the second image 1502 lie within the predetermined value M is discriminated (S1602).

If it is determined that they lie within the predetermined value M, the second image 1502 serving as a comparison image is decided as an additional image (S1603). A moving process is executed so as to execute the same processes as the processes of the first image 1501.

As mentioned above, according to the embodiment, such a situation that the characters and image included in the Web page are divided by the pages can be prevented. Since the elements are divided and arranged to two pages according to the contents of the elements, the number of sheets which are used for printing can be decreased as compared with that in the case where all of the elements which are arranged to the page partition position are arranged to one of the two pages.

In the embodiment, either the mode in which the elements are divided and arranged to two pages or the mode in which the elements are arranged to one of the two pages is determined according to the contents of the elements which are arranged to the two pages. Thus, the elements can be properly arranged to each page.

The example in which in the case of discriminating the contents of the elements which are arranged to the two pages, whether the object is the image object or the text object is discriminated has been shown in the above description.

However, the invention is not limited to such an example but, for example, the number of lines and the character size of the character string corresponding to the text object or the size of text object is discriminated and either the mode in which the text object is divided and arranged or the mode in which the text object is arranged to one page may be determined according to a result of the discrimination.

Further, the contents of the text included in the text object is discriminated and a layout of the text object may be determined according to a result of the discrimination. For example, to the text included in the text object, a keyword showing a relation to another object is searched for. In the case of the text object including the keyword, it may be arranged to one page without being divided.

Either the mode in which the object is divided and arranged or the mode in which the text object is arranged to one page may be determined according to the position in the width direction in the page of the object. For example, when the image object and the text object are detected at the page partition position, if the positions in the width direction in the page of both of those objects are close, it is determined that they are the two objects which are related in the Web page, and each of the whole image object and the whole text object may be arranged to one page. On the other hand, if a distance between the image object and the text object in the page is large, it is determined that they are not the related objects, and the text object may be divided and arranged to two pages.

The page partition in the length direction of the Web page has been described above. However, if there are elements which are arranged to two pages at the page partition position in the width direction of the Web page, the elements may be arranged to the pages according to the contents of the elements as mentioned above.

Further, a construction in which the width of Web page is changed to be congruous with the width of page adapted to arrange the Web page is also considered. In this case, the layout process of the elements to the page partition position in the length direction of the Web page described in the embodiment may be executed to the Web page whose width direction has been changed.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. JP2009-156380, filed Jun. 30, 2009, which is hereby incorporated by reference herein in its entirety.

The invention claimed is:

1. An apparatus for arranging a plurality of elements, the apparatus comprising:
   a memory configured to store a program; and
   a processor configured to execute the program stored in the memory,
   wherein the processor acquires a text element and an image element, each of which strides over a first page partition position corresponding to a bottom of a first page in a vertical direction,
   wherein the processor sets a line space, in a text element, nearest from the first page partition position over which the text element strides, among line spaces that are at an upper side relative to the first page partition position in the vertical direction, as a second page partition position, and
   wherein the processor arranges the text element and the image element, so that the text element is divided, at the second page partition position, into the first page and a second page, and a whole of the image element is arranged to the second page, and so that a relative position between a portion, obtained by the dividing, of the text element and the whole of the image element in the vertical direction of the second page is a relative position, in the vertical direction, in a case in which a whole of the text element and the whole of the image element are arranged to one page.

2. An apparatus according to claim 1, wherein the processor sets a line space corresponding to a top position of the image element in the vertical direction, as the second page partition position.

3. An apparatus according to claim 2, wherein the processor sets a line space nearest from the top position of the image element among line spaces that are at an upper side relative to the top position in the vertical direction, as the second page partition position.

4. An apparatus according to claim 1, wherein the processor causes an outputting apparatus to output an image corresponding to the second page, in which the portion of the text element and the whole of the image element have been arranged.

5. An apparatus according to claim 4, wherein the outputting apparatus is a printing apparatus, and the processor causes the printing apparatus to print at least one of the plurality of elements.

6. An apparatus according to claim 4, wherein the outputting apparatus is a display apparatus, and the processor causes the display apparatus to display at least one of the plurality of elements.

7. An apparatus according to claim 1, wherein the plurality of elements are arranged in a Web page that can be displayed by a web browser.

8. An apparatus according to claim 7, wherein the processor further
   (i) cuts out a portion of the Web page, and
   (ii) executes the arrangement to the plurality of elements included in the portion of the Web page.

9. An apparatus according to claim 8, wherein the processor further cuts out the portion designated by a user.

10. An apparatus according to claim 7, wherein the processor further executes the arrangement to intermediate data corresponding to the Web page.

11. An apparatus according to claim 1, wherein the second page is a latter one of the first page and the second page.

12. An apparatus according to claim 1, wherein the processor detects one or more elements among the plurality of elements that strides over the first page partition position, and executes the arrangement of the text element and the image element in a case in which the text element and the image element are detected.

13. An apparatus according to claim 12, wherein a user moves an image including the text element and the image element in a page or changes a size of the image including the text element and the image element in a page, and the processor detects the text element and the image element as the one or more elements among the plurality of elements that strides over the first page partition position by the moving or the changing.

14. A non-transitory storage medium in which a program, for causing a computer to execute the method of arranging a plurality of elements, has been stored, the method comprising the steps of:
   acquiring a text element and an image element, each of which strides over a first page partition position corresponding to a bottom of a first page in a vertical direction;
   setting a line space, in a text element, nearest from the first page partition position over which the text element strides, among line spaces that are at an upper side relative to the first page partition position in the vertical direction, as a second page partition position; and
   arranging the text element and the image element, so that the text element is divided, at the second page partition position, into the first page and a second page, and a whole of the image element is arranged to the second page, and so that a relative position between a portion, obtained by the dividing, of the text element and the whole of the image element in the vertical direction of the second page is a relative position, in the vertical direction, in a case in which a whole of the text element and the whole of the image element are arranged to one page.

15. A non-transitory storage medium according to claim 14, wherein, in the setting step, a line space corresponding to a top position of the image element in the vertical direction, is set as the second page partition position.

16. A non-transitory storage medium according to claim 15, wherein, in the setting step, a line space nearest from the top position of the image element among line spaces that are at an upper side relative to the top position in the vertical direction, is set as the second page partition position.

17. A non-transitory storage medium according claim 10, wherein the method further comprises causing an outputting apparatus to output the image corresponding to the second page.

18. A non-transitory storage medium according to claim 17, wherein the outputting apparatus is a printing apparatus, and the image is printed by the printing apparatus.

19. A non-transitory storage medium according to claim 17, wherein the outputting apparatus is a display apparatus, and the image is displayed by the display apparatus.

20. A non-transitory storage medium according to claim 14, wherein the plurality of elements are arranged in a Web page that can be displayed by a web browser.

21. A non-transitory storage medium according to claim 20, wherein the method further comprises:
    cutting out a portion of the Web page, and
    executing the arrangement of the plurality of elements included in the portion of the Web page.

22. A non-transitory storage medium according to claim 21, wherein the portion designated by a user is cut out.

23. A non-transitory storage medium according to claim 20, wherein the arrangement is executed to intermediate data corresponding to the Web page.

24. A non-transitory storage medium according to claim 14, wherein the second page is a latter one of the first page and the second page.

25. A non-transitory storage medium according to claim 14, wherein the method further comprises detecting one or more elements that strides over the first page partition position, among the plurality of elements, the arrangement of the text element and the image element being executed in a case in which the text element and the image element are detected.

26. A non-transitory storage medium according to claim 25, wherein the method further comprises a user moving an image including the text element and the image element in a page or changing a size of the image including the text element and the image element in a page, and the text element and the image element are detected as the one or more elements that strides over the first page partition position by the moving or the changing.

27. A method of arranging a plurality of elements, the method comprising the steps of:
    acquiring a text element and an image element, each of which strides over a first page partition position corresponding to a bottom of a first page in a vertical direction;
    setting a line space, in a text element, nearest from the first page partition position over which the text element strides, among line spaces that are at an upper side relative to the first page partition position in the vertical direction, as a second page partition position; and
    arranging the text element and the image element, so that the text element is divided, at the second page partition position, into the first page and a second page, and a whole of the image element is arranged to the second page, and so that a relative position between a portion, obtained by the dividing, of the text element and the whole of the image element in the vertical direction of the second page is a relative position, in the vertical direction, in a case in which a whole of the text element and the whole of the image element are arranged to one page.

28. A method according to claim 27, wherein, in the setting step, a line space corresponding to a top position of the image element in the vertical direction, is set as the second page partition position.

29. A method according to claim 28, wherein, in the setting step, a line space nearest from the top position of the image element among line spaces that are at an upper side relative to the top position in the vertical direction, is set as the second page partition position.

30. A method according claim 27, wherein the method further comprises causing an outputting apparatus to output the image corresponding to the second page.

31. A method according to claim 30, wherein the outputting apparatus is a printing apparatus, and the image is printed by the printing apparatus.

32. A method according to claim 30, wherein the outputting apparatus is a display apparatus, and the image is displayed by the display apparatus.

33. A method according to claim 27, wherein the plurality of elements are arranged in a Web page that can be displayed by a web browser.

34. A method according to claim 33, wherein the method further comprises:
    cutting out a portion of the Web page, and
    executing the arrangement of the plurality of elements included in the portion of the Web page.

35. A method according to claim 34, wherein the portion designated by a user is cut out.

36. A method according to claim 27, wherein the arrangement is executed to intermediate data corresponding to the Web page.

37. A method according to claim 27, wherein the second page is a latter one of the first page and the second page.

38. A method according to claim 27, wherein the method further comprises detecting one or more elements that strides over the first page partition position, among the plurality of elements, the arrangement of the text element and the image element being executed in a case in which the text element and the image element are detected.

39. A method according to claim 38, wherein the method further comprises a user moving an image including the text element and the image element in a page or changing a size of the image including the text element and the image element in a page, and the text element and the image element are detected as the one or more elements that strides over the first page partition position by the moving or the changing.

* * * * *